United States Patent [19]

Verboom

[11] Patent Number: 4,583,208

[45] Date of Patent: Apr. 15, 1986

[54] SECTOR MARK DECODER FOR AN OPTICAL RECORDER

[75] Inventor: Johannes J. Verboom, Bergeyk, Netherlands

[73] Assignee: Optical Storage International-U.S., Minneapolis, Minn.

[21] Appl. No.: 578,149

[22] Filed: Feb. 8, 1984

[51] Int. Cl.$^4$ .............................................. G11B 7/00
[52] U.S. Cl. ....................................... 369/32; 369/33; 369/41; 369/44; 369/59; 360/72.1
[58] Field of Search ....................... 369/32, 33, 41, 59, 369/47, 50, 43, 44; 358/342; 360/72.1, 72.2, 74.4, 78

[56] References Cited

U.S. PATENT DOCUMENTS

| | | | |
|---|---|---|---|
| 4,523,304 | 6/1985 | Satoh et al. | 369/32 |
| 4,535,439 | 8/1985 | Satoh et al. | 369/275 |

Primary Examiner—Robert L. Richardson
Attorney, Agent, or Firm—J. A. Genovese; E. P. Heller, III

[57] ABSTRACT

Disclosed is a sector mark decoder for an optical recorder. Sector marks are prerecorded on the optical recording surface and comprise a series of evenly spaced marks. Data is recorded on the media in a fixed block code via holes burned into the optical recording surface. Both sector marks and data are detected by common apparatus, but are distinguished from each other by their different recording format. The location of a hole or a prerecorded mark is determined by comparing two sample and hold cells in a comparator. One holds the read signal value received at one disk position and compares it to the signal value held in the other sample and hold cell received at the previous position. If the comparison results in a new higher valued signal being found, the output of the comparator changes. The new higher valued signal is retained and the other sample and hold cell samples at the next disk position. This sequence continues until a sector mark has been decoded.

If the output of the comparator changes, the "address" of the change is recorded. A sequencer determines from the "addresses" of a series of holes or prerecorded marks that a sector mark is being detected, and issues a sync pulse. If the sequence of "addresses" does not correspond to a sector mark sequence, data holes are being read and a sync pulse is not issued.

6 Claims, 29 Drawing Figures

SECTOR MARK DECODER FOR AN OPTICAL RECORDER

BACKGROUND OF THE INVENTION

1. Field of the Invention

The invention relates generally to the field of optical recording systems and more particularly to apparatus for detecting and decoding sector marks therefrom.

2. Brief Description of the Prior Art

Sector marks generally comprise areas of the optical surface having information recorded thereon which violates one or more rules by which the data is recorded. In optical recording systems of a type employing prerecorded clock signals on pregrooved disks, the sector marks have either had a gap in which could be detected by a low pass filter, or by threshold detectors and prerecorded data which was detected input to a shift register, or a combination of the two. When the detected pattern in the shift register corresponded to the pattern of a sector mark, a sync pulse was issued indicative of such detection.

It is not desirable to use a gap as a part of a sector mark in a device having a prerecorded clock in a pregrooved disk. This entails loss of both disk clock information and disk servo system tracking information. Loss of clock information can cause a phase lock loop, locked to the prerecorded clock, to drift, even if marginally, to degrade system performance. The same is true of servo systems when tracking information is lost.

Secondly, it is not desirable to use threshold detection in combination with shift register decoding. In optical systems, it is very difficult to set such a threshold. The optical recorder reading the information from the optical disk does so conventionally by means of a laser operated at read power. The beam reflects from the disk, and the drop in reflection normally indicates the presence of a hole or a prerecorded mark. Because reflected spot density distributions have a Gaussian shape, the hole associated power of the reflected beam (the hole associated power means the inverse of the reflected power from the disk) spreads a significant distance beyond the boundaries of the holes themselves. Indeed, the hole power present at the center of the next possible position of a hole or a prerecorded mark in closely spaced systems may be significant. Therefore, one cannot rely on threshold detectors to detect the presence of a hole or a prerecorded mark, because the threshold may be reached due to a hole or a prerecorded mark at an earlier or later position, or a combination of the two. Additionally, hole sizes vary widely causing correspondingly wide variations in the amplitude of the signals indicative of the presence of holes. As well, prerecorded material, such as sector marks, cause drops in reflection far less than that caused by burned holes. This necessitates a variation in the threshold level depending on the type of material being read. Moreover, other system variables negative the use of threshold detection. Among these are reflectivity variations from disk to disk and across a single disk, variations in laser power levels, optical efficiency, sense diode coupling errors, circuit tolerances, etc. For these reasons, an alternative method of detection of sector marks is desirable. The method employed by the preferred is that of differential detection.

SUMMARY OF THE INVENTION

The invention comprises apparatus which determines the location of a hole or a prerecorded mark by differential detection and further determines the presence of a sector mark by recording the "address" of the hole or prerecorded mark and looking for a predetermined sequence of prerecorded marks. Detection is accomplished by two sample and hold cells sampling the signal read from the optical recording surface. These are input to one comparator. One sample and hold cell comparator is clocked at the first position of a section. (A section comprises the period between the points where two clocks, driven by the phase lock loop locked to the prerecorded clock but having different frequencies from each other, are in the same phase relationship.) The other is clocked at the next position. If the second is higher, the output of the comparator changes. If it is not, the output of the comparator does not change. In either case, the timing circuit knows which cell has the highest valued signal in it and clocks the other, the one with the lower valued signal, at the next position This process continues until all section positions have been sampled. Every time the state of the comparator changes, a transition detector connected to the comparator signals the change by generating a pulse. This pulse causes the phase state of the two clocks to be input into a register. The phase of the clocks comprises the "address" of the section position of the transition. If a hole or a prerecorded mark is present in the section, the last time the comparator changes is at the position of the hole or prerecorded mark. At the end of a section, the "address" of the hole is recorded in a register and a sequencer determines whether the address is a valid address for the prerecorded mark of a sector mark . If it is, the sequencer is updated to look for the next prerecorded mark's address after the next section. If it is not, data holes are being read, not the prerecorded marks of a sector mark. After all the prerecorded marks of the sector mark have been recognized by the sequencer, it issues a sync pulse indicative of the decoding of a sector mark.

DESCRIPTION OF THE PREFERRED EMBODIMENT

Figure 1:
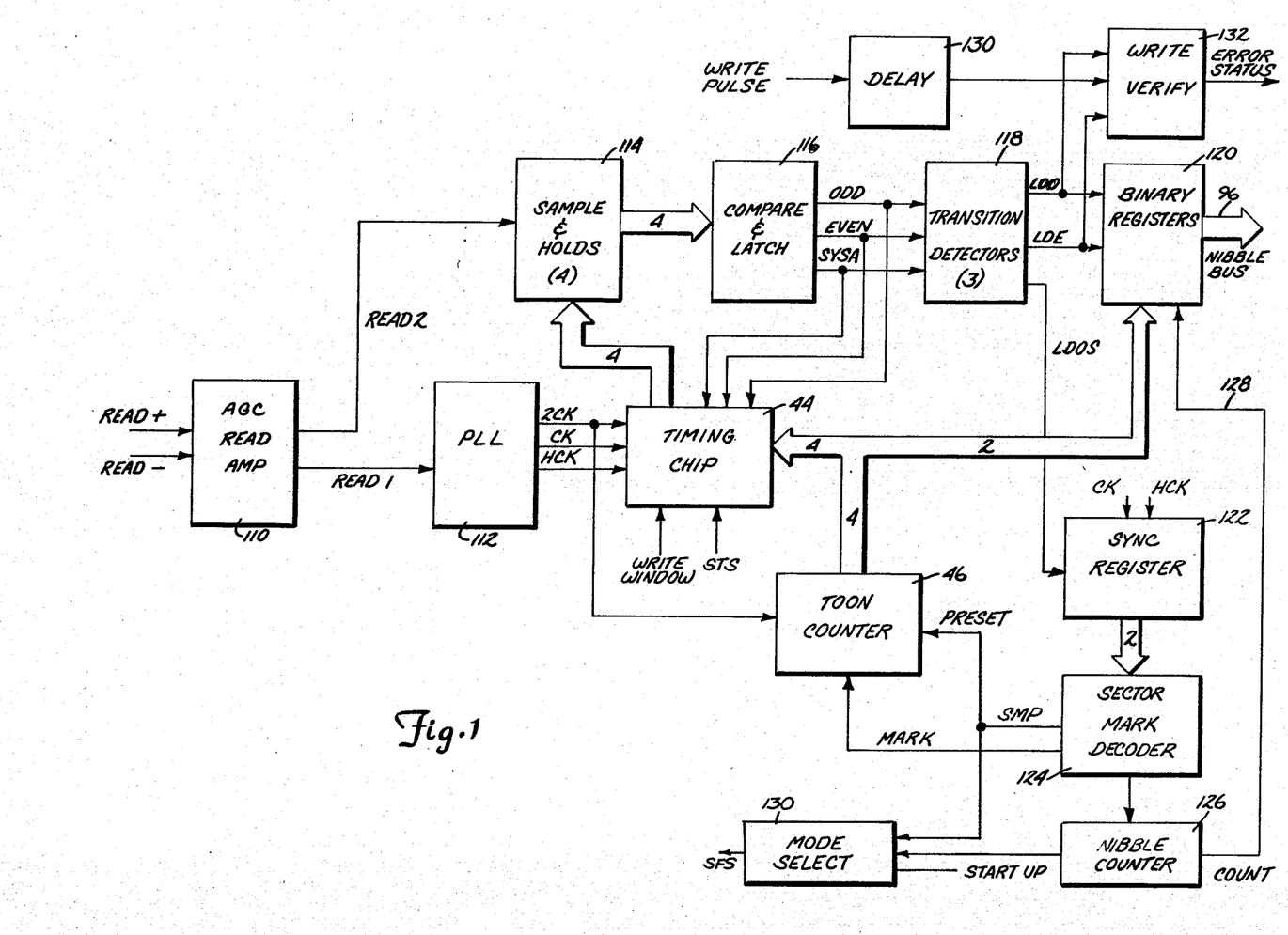
FIG. 1 is a block diagram of the read channel of the present invention.

FIG. 1 shows a block diagram of the read channel of the optical recorder of the preferred embodiment which includes the sector mark decoder of the present invention. The signal from the read detector is input to the AGC 110 shown in FIG. 1, which outputs the amplified and limited signal on Read 1 and Read 2 outputs. The Read 1 output is input to a phase lock loop 112 which tracks a prerecorded clock inscribed in the optical disk. The phase lock loop outputs several clock signals: a 2CK clock at a frequency twice that of the prerecorded clock, a CK clock at the frequency of the prerecorded clock and HCK clock at half the frequency of the prerecorded clock. The 2CK is input to a Timing Chip 44 and to a TOON counter 46. TOON is the name of the fixed block code of the preferred embodiment. The TOON Counter's essential purpose is to count the number of symbol positions of a TOON symbol to generate a symbol position address. The function of the Timing Chip 44 will be discussed infra.

The Read 2 signal is input to four gated sample and hold cells 114, two cells each for the respective even and odd symbol positions of the TOON code. The two cells for the odd symbol positions are also used by the present invention to decode sector marks. The sampling of the cells is controlled by Timing Chip 44. The outputs of the cells are input to two comparators 116, an even and an odd comparator respectively, which determine which of the two sample and hold cells input to it has the highest hole associated signal power. Again, the odd comparator forms part of the sector mark decoder. The latched comparator outputs are fed back to Timing Chip 44 and to a transition detector circuit 118. The transition detectors detect a change in the state of the comparators 116 outputs and signal that change first to a pair of binary registers 120, one 84 for the even and one 86 for the odd symbol positions, which record the TOON counter address of the change and second to a sync register 122 which records the clock "address" of the change in separate sync registers. The TOON address of the change is the count on the TOON Counter 46 divided by two ignoring the remainder. The clock "address" is different from the TOON address, and comprises the relative states of the clocks CK and HCK. The binary registers are copied into one of two four-bit output registers 88, 90, at the end of a symbol. After two symbols have been recorded in the output registers, the optical disk recorder reads the eight binary bits of data out of the registers along a data bus 96.

The read channel detects the presence of prerecorded sector marks as well as data holes. The address information recorded in sync register 122 is provided to sector mark decoder 124, which decodes the presence of a sector mark by recognizing a predetermine sequence of "addresses". When a sector mark has been decoded, the decoder initializes TOON counter 46 and a nibble counter 126, which continues to count up by one each symbol until the next sector mark. The lowest order bit 128 of this nibble counter, nibble count 0, is provided to clock the output registers 88 and 90.

The present invention pertains to an optical recording system which writes data on an optical disk in fixed-block format wherein binary data is encoded into a symbol having a predetermined number of positions in which a predetermined number of holes are recorded. The preferred embodiment uses a so-called TOON code which has eight positions in which holes may be written and one position in which no holes are written. The latter position is normally reserved at the end of the symbol. The TOON code is further constrained to have one hole written at an even position and one hole written at an odd position. Only two holes are written in the symbol.

Figure 2:
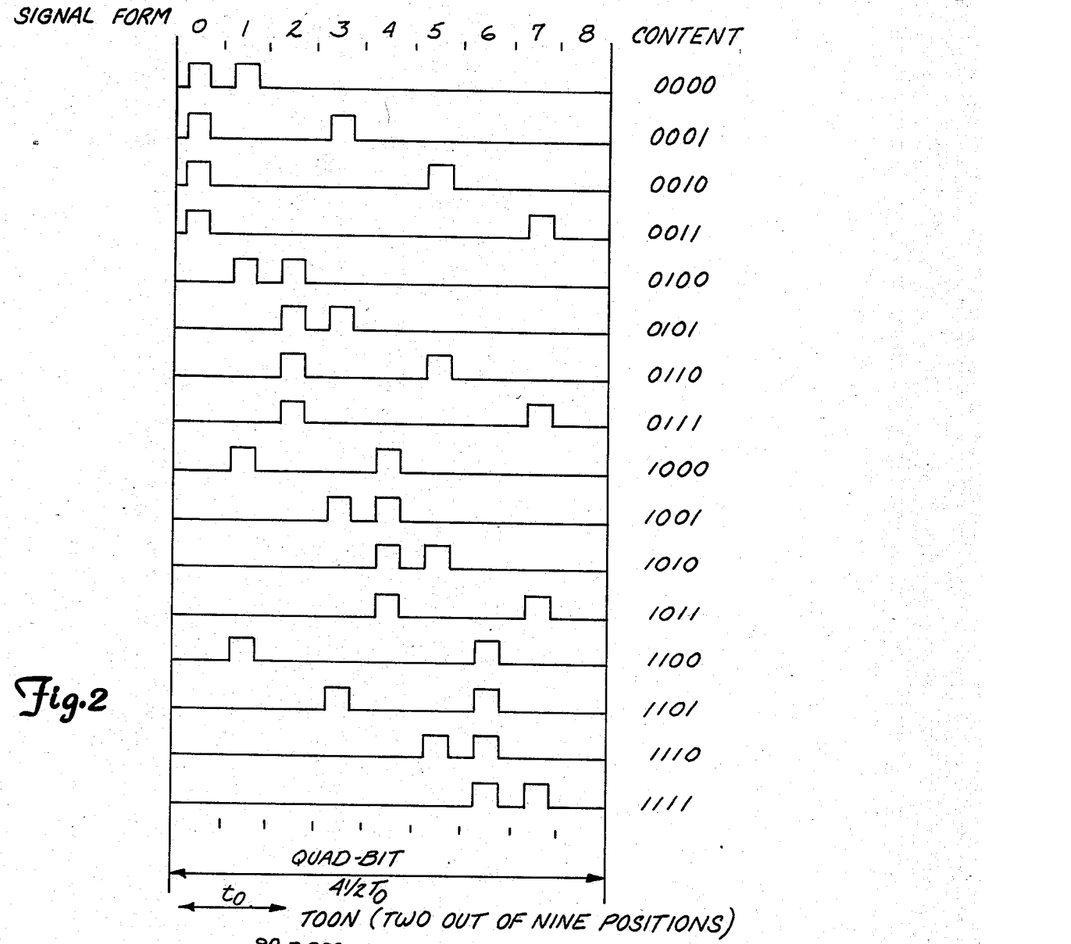
FIG. 2 shows the TOON code and its corresponding binary equivalent.

FIG. 2 shows the TOON code. It has nine positions numbered in the Figure from zero to eight. The ninth position, number eight, is the one constrained to never have a hole recorded in it. The other eight positions have one hole in an even position and one hole in an odd position. The code is shown in the Figure and the corresponding binary bit values are shown in the table to the right. Each symbol of the TOON code encodes four bits of information.

The code is recorded on the media in such a manner that four and one half clock periods, $T_o$, span the symbol. Referring to FIG. 3a, the prerecorded clock is illustrated as the sinusoidal line 10. It is from this signal that the phase lock loop generates the CK signal shown in FIG. 3b.

Each transition of CK denotes the center of a symbol position. The transitions of CK occur at the zero crossings of the prerecorded clock.

FIG. 3i corresponds to the TNC0 bit out of the TOON Counter 46. It undergoes eight transitions during a symbol and the transitions occur at the center of a given symbol position The numbers in the figure correspond to the number of the symbol position in which the next transition occurs. There is no transition in symbol position number 8 primarily because no hole will ever be recognized in this position even if a hole is somehow recorded therein.

Holes are preferably written and marks are preferably prerecorded at the center of a symbol position. To write a hole, the optical recording device generates a write pulse from a laser beam of approximately 60 nanoseconds in length. The symbol position length or the length of time for a symbol position to pass past a fixed location at typical operating speeds of the optical recording system of the preferred embodiment is 180 nanoseconds. The hole burned into the optical recording medium by such a write pulse is typically much larger than 60 nanoseconds in length and may be larger than the 180 nanoseconds length of a symbol position.

In contrast to holes, the marks of a sector mark are prerecorded on the disk during manufacture. The marks essentially comprise recesses stamped into the optical recording surface to a depth of approximately one-fourth wavelength of the laser beam. While the mark may be coated with reflective material, the depth of the mark causes the beam reflected from the bottom of the mark to be 180 degrees out of phase with the incoming beam. Thus the reflected beam is cancelled by the incoming beam.

In the preferred optical disk, there are 32 sector marks per revolution each comprised of 16 prerecorded marks, and further having a preceding and following data symbol in which no data is recorded.

FIG. 3a shows the inverse of the power of the reflected laser beam for the sixteen marks of a typical sector mark prerecorded on the optical recording medium. The absence of reflection caused by the presence of a mark is shown as a positive signal, while the presence of reflection is indicated by a negative signal. The vertical dashed lines in the figure represent the boundaries of the sector mark field. The corresponding data symbol position numbers as indicated by TOON counter 46 at the boundaries are indicated in FIG. 3i.

Again referring to FIG. 3a, the optical recording surface reflection indicates the presence of marks at the center of symbol positions numbers 4 and 8 of the first symbol of the field. The marks do not reflect the laser beam and the inverse of the signal detected by apparatus detecting the reflected beam will generate a high signal at 14 and 16 in the figure. As can be seen by inspection of the figure, the hole associated power 20 of the mark at symbol position 4 will be present to a significant degree at symbol position 5.

The second positive going pulse 28 in FIG. 3a represents a second mark prerecorded at the center of symbol position 8. Here again, the line 28 represents the hole associated signal power which is received by the read system when it detects the hole under normal reading conditions.

Both the first and the second marks occur at even symbol positions. This violates the TOON code rule that holes appear at one even and at one odd symbol position. The third mark 18 occurs at symbol position number 8. This additionally violates the TOON rule that no hole appear at this position. Thus the sequence of marks of a sector mark can readily be distinguished from the sequence of holes of a data symbol.

Further inspection of FIG. 3a shows that the sixteen sector marks are grouped into four groups. The first four occur at even field position numbers four positions apart, beginning at field position number 4. The next four occur at odd field position numbers beginning at field position number 21, each four positions apart. (The TOON counter does not actually count to 21; it resets after 8. However, the sector mark field can be viewed as an unity having 72 positions, 0–71.) The third group of four occurs at even positions beginning at position number 38, each four positions apart. The fourth group occurs at odd positions beginning at position number 55, each four positions apart.

Placing an even number of marks on the rising edge and on the falling edge of the prerecorded clock preserves a null in the frequency spectrum at the frequency of the clock because the frequency components of those signals on the rising edge are 180 degrees out of phase with those at the falling edge, leading to mutual cancellation.

FIG. 3c shows HCK in a first phase relationship to CK and FIG. 3f shows HCK in a second phase relationship to CK. HCK may assume either of these phase relationships at start-up, because HCK is essentially the output of a bi-stable flip flop clocked by CK. Referring to FIG. 3c in conjunction with FIG. 3b, the state of CK and HCK shortly before the center of the first mark 20 shown in FIG. 3a is 00, i.e., both have a zero state. This relative state is maintained at each of the next three marks of the first group. If HCK were delayed by one-half period of CK, the relative states would be 11, the leftmost bit representing HCK and the rightmost CK. In a modulus four number system, this is the number 3. If the address of the mark were recorded one-half period of CK later, the state of Ck and delayed HCK would now be 2. Referring to FIG. 3d, which shows a series of numbers separated by vertical dashed lines, the number 2 appears after each of the four marks of the first group. This number corresponds to the least significant digit of the mod 4 address +1 of the field position in which the mark occurred as determined by CK and a shifted HCK.

With HCK shifted right, the relative states of the two clocks proceed in the sequence 0 3 2 1. That is 1+2=1, 1+1=0, 1+0=3, and 1+3=2. The second group of four marks occurs plus one positions from the mod 4 positions of the first group. Thus the state of CK and shifted HCK is 1+2=1, and these are the mod four addresses +1 of the second group. The mod 4 addresses +1 of the third group are 0; and the mod 4 addresses +1 of the fourth group are 3.

Were HCK to start in the opposite state at start-up, shown in FIG. 3f, then the mod 4 addresses +1 would be plus 2 from the above-referenced addresses: 2+2=0, 1+2=3, 0+2=2, and 3+2=1. These addresses are shown in FIG. 3g.

In either case, the sequence of addresses shows the same mod four order, 2 1 0 3 or 0 3 2 1; one being offset from the other by a count of two. These addresses are used by the apparatus of the present invention to determine whether a sector mark is present.

Figure 4:
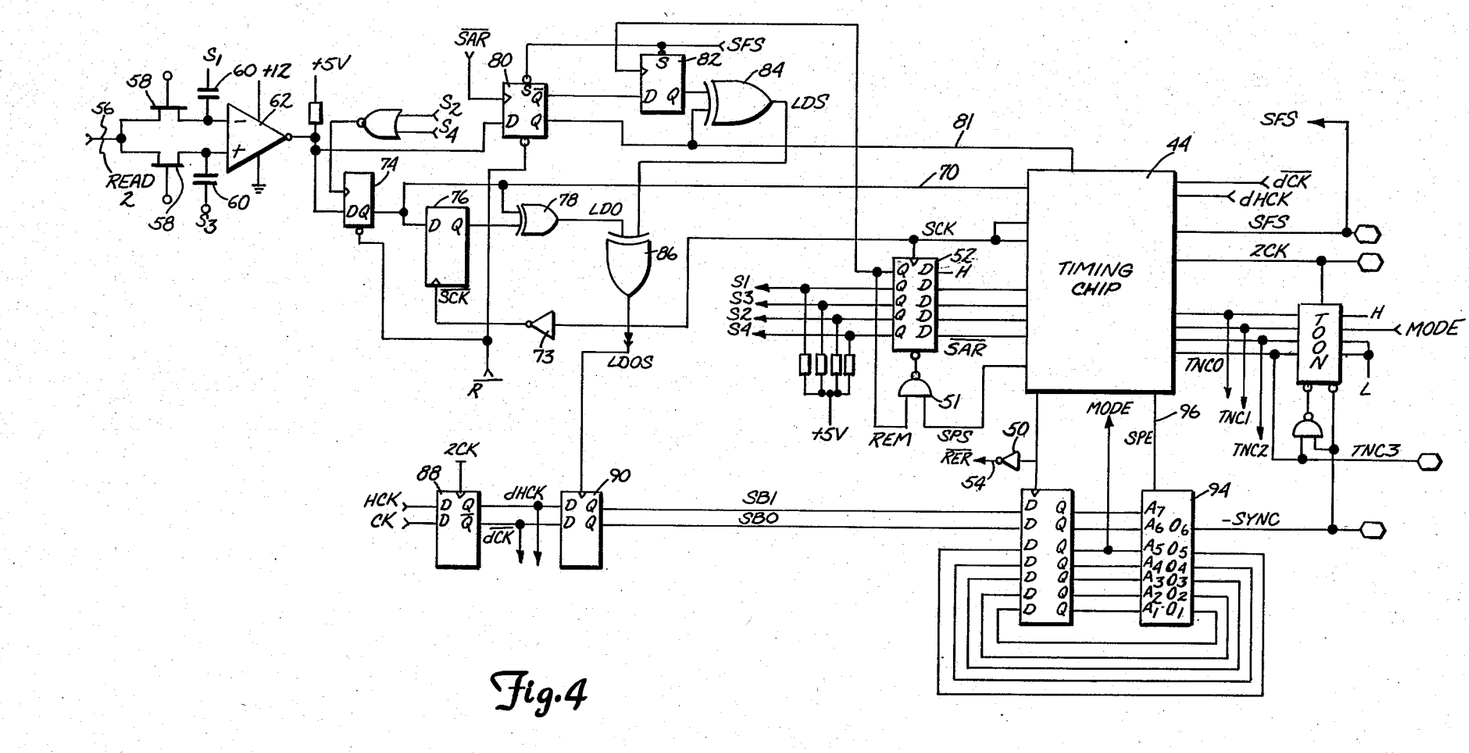
FIG. 4 is a schematic circuit diagram of the critical circuits of the present invention.

FIG. 4 shows apparatus first for detection of the secondly for decoding the location of a mark or a hole and secondly for decoding the presence of a sector mark.

Figure 5:
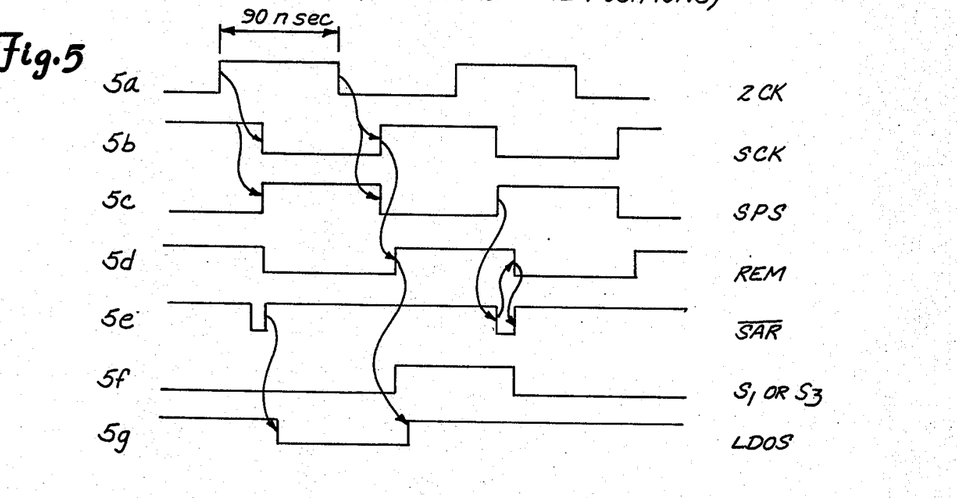
FIG. 5 consisting of 5a–5g, is a timing diagram showing the fine timing differences between several of the signals of FIG. 3.

Referring to the top right-most part of FIG. 4, the 2CK clock derived from the phase lock loop 116 is provided as an input to both a Timing Chip 44 and a TOON counter 46. See FIG. 5a for 2CK. The fall of 2CK denotes the beginning of a position and the rise of 2CK denotes the center of a position. See FIG. 6a for the positioning of 2CK relative to the three marks 14, 16 and 18. There are exactly nine 2CK clocks in a data symbol and four in a sector field section. The rise of 2CK occurs approximately at the zero crossings of the prerecorded clock. The phase relationship is adjusted to provide that the clocking of the sample and hold cells, infra, occurs at such a time that the peak value of the signal from a hole is sampled.

TOON counter 46 counts once for each cycle of the 2CK with its four-bit count on outputs TNC0, TNC1, TNC2, and TNC3, respectively. A count of 8, TNC3, synchronously (at the next clock) resets the counter to zero due to the inverter 48 feeding TNC3 back into master reset not 50 of the TOON counter 46. The state of TNC1 is shown at FIG. 3n and the state of TNC3 is shown at FIG. 3p.

The Timing Chip outputs and S-clock ("SCK") which corresponds directly with the 2CK signal. SCK is delayed from 2CK by approximately 22.5 nanoseconds and inverted therefrom as can be seen from relative timing diagram FIGS. 5a and 5b.

The Timing Chip 44 also outputs through register 52 signals S1, S2, S3 and S4. Register 52 is clocked by SCK, as better can be seen in FIG. 5 where S1 rises shortly after the rise of SCK.

The Timing Chip 44 also outputs an RER signal, which is inverted by inverter 54, to become an RER NOT signal. The signal RER is output once per section at every count of 0 of dCK NOT and dHCK. See FIG. 6l. The purpose of RER is to signal the end of a section to various registers as will be discussed infra, and also resets other registers.

The two signals dCK NOT and HCK are the outputs of register 88 having CK and HCK as inputs and as clocked by 2CK. dCK NOT is output on the Q NOT output of the register 88 and is the delayed and inverted CK. As the period of delay is 2CK, one-half CK, dCK NOT directly corresponds to CK, but is delayed by the gate delays of the register 88. The two signals, dCK NOT and HCK are provided as inputs to Timing Chip 44 and to an address register 90. One cycle of the four relative phase states of dCK and HCK comprise one sector field section as can be seen from FIGS. 6i through 6l.

The following will be a brief discussion of the read circuitry as it operates in the read mode. When in the search for sync mode, this circuitry is partially used by the sector decoder circuitry and partly disabled.

Referring to the upper left hand portion of FIG. 4, the pair of gates 58 and capacitors 60 comprise the odd sample and channel sample and holds 116. The even hold cells of the read sample and holds are not shown for the purposes of clarity, but they are identically structured. Shown also is the odd comparator 62. Not shown is the even comparator, identically structured. All the structure henceforth mentioned for the odd circuitry is duplicated for the even circuitry. The only difference between the two circuits is their control signals. The odd circuitry is controlled by the signals S1 and S3, while the even circuitry is controlled by the signals S2 and S4.

The signals S1 to S4 control corresponding FET gates between the Read 2 input 56 and respective grounded capacitors 60. The combination the gates and the capacitors form the respective sample and hold cells. The respective sample and hold cells will henceforth be referred by the respective signals controlling their gates, S1, S2, S3 and S4. The signal input on Read 2 line 56 corresponds to the hole associated power of the reflected laser beam as discussed above. Each of the capacitors 60 is also connected to the odd comparator 62. Comparator 62 compares the signal value on the S1 sample hold with the signal value then present on the S3 sample and hold. The odd comparator outputs the result of the comparison on output 66, which is provided as an input 70 to the Timing Chip 44 through flip flops 74.

Signals S1-S4 and REM are set by the rising edge of SCK clocking register 52. Signal SAR NOT resets register 52 and it Q outputs S1 through S4 and REM. SAR NOT is triggered at the falling edge of SCK, see FIG. 5 where it can be seen that at the fall of the SCK signal, which occurs 22.5 nanoseconds after the fall of the 2CK signal, causes the Timing Chip 44 to output a signal SPS (FIG. 5c), which when coupled with the REM signal from register 52 (FIG. 5d) through NAND gate 51, generates an SAR NOT signal (see FIG. 5e) which resets register 52 and thereby resets signal S1 through S4 and REM as can be seen from FIGS. 5f and 5d, which shows the resetting of the S1 and REM signals respectively. The reset of REM in turn resets SAR NOT. Thus, the S1 signal is normally "on" for a period of approximately 90 nanoseconds from a point approximately 30 nanoseconds after the fall of the 2CK signal to approximately 30 nanoseconds after its rise. In the preferred embodiment, the phase lock loop 112 adjusts the phase of 2CK such that it rises approximatley 30 nanoseconds before the center of a symbol position. Thus the sampling terminates in actual practice exactly at the center of a hole, the point at which the signal from the hole is greatest, the peak value.

During the first odd position of a symbol during normal reading, position number 1, sample and hold S1 is turned on to sample the signal. The signal present on the Read 2 line 56 during this symbol position is copied into the capacitor 60 of the S1 sample and hold cell. At the next odd position, sample and hold cell S3 is triggered to record the signal level at symbol position number 3. Comparator 62 compares the value of sample and hold cells S1 and S3, the odd sample and holds. If, for example, the results of this comparison indicate that the S1 sample and hold value exceeds the S3 sample and hold value, the output 66 of the comparator 62 is low. The Timing Chip 44 then saves the higher of the two values, S1. It does this at the next occurrence of an odd cell by triggering the other sample and hold S3, which then holds the lowest valued signal of the two. If again the S1 sample and hold contains the highest value at the next occurrence of an odd symbol position, the S3 sample and hold is again triggered. This process continues throughout the symbol with the highest valued sample and hold cell retained and compared with the next sampled value At the end of the symbol, one of the sample and holds of the comparator will contain the highest valued signal, and this signal corresponds to signal generated by the odd hole within the symbol, if there was a hole recorded there. A similar process is performed with the even sample and holds and the even comparator on the even symbol positions, resulting in the detection of the location of the even symbol position with the highest signal value.

If at any time the two signal levels present in the respective sample and holds are about equal, which may occur when the holes are recorded later in the symbol or a section, the state of the comparator 62 is indeterminate. Either one of the two sample and holds is retained for the next symbol. This feature is illustrated by the dashed lines shown in FIGS. 6d and 6e which show the triggering of the S1 and S3 sample and hold cells when it can not be determined which of the two initially holds the higher signal.

Timing Chip 44 recognizes the finding of a new higher valued signal by the change in the output of the comparator 62. The output of the comparator 62 is provided as an input to respective registers 74 and 80. The register 80 will be discussed momentarily in regard to its sector mark decoder function The register 74 output is in turn provided to register 76 and as one input to exclusive-OR gate 78. The output of register 76 is provided as the other input to exclusive-OR gate 78. Registers 74 is clocked by OR gate 71, which forms the logical OR of the signals S2 and S4. A similar register connected to the output of the even comparator is clocked by an OR gate connected to S1 and S3 . This method of clocking these registers assures that the outputs of the comparators are sampled after the comparators have changed state, i. e., register 74 records the output of the odd comparator at the next even position approximately 90 nanoseconds after signals S1 and S3 have fallen. The state of the register remains steady for a predetermined period, the period of SCK, which cannot be said for the state of the comparator 62. Note that RER NOT initializes register 74 and the even register (not shown) at the beginning of a symbol.

Register 76 is clocked by the inversion of SCK approximately 90 nanoseconds after the clocking of register 74 and 75. The exclusive-OR gate 78 compares the output of the comparator 62 from one odd symbol position to another and generates a pulse of approximately 90 nanoseconds duration if the output changes. Exclusive-OR gate 78 generates the pulse LDO indicative of the change in the relative signal levels in the S1 and S3 sample and holds. The pulse LDO occurs only when a new "higher" signal level has been recognized by the comparator. A similar pulse is issued by a similar thates the pulse exclusive-OR gate for the even symbol positions.

At start-up or after nibble counter 126 has reached a predetermined count indicative of the end of data symbols of a sector, a Mode Select issues an SFS signal indicative of a Search for Sync mode for the read channel. This signal is provided as an input to the Timing Chip 44 and the SET NOT inputs of flip flops or registers 80 and 82. This sets the SFS mode in the Timing Chip and it alters the pattern of issuance of the respective S1 through S4 signals, and the RER NOT signal (formerly issued during position number 0 of a data symbol.) When in SFS mode, the Timing Chip does not issue S2 and S4 signals, this the even sample and holds and comparator, etc., are inoperative. This is why they have been omitted from the drawing and from a detailed discussion. However, when S2 and S4 are not issued, OR gate 71, responsive to these two signals, is inoperative also. Thus, register 74 is never clocked and cannot register the state of the output of comparator 62. As RER NOT resets this register, it remains in an off state. Register 76, which samples the output of register 74, remains in an off state. As a result, LDO remains permanently off during SFS mode. This enables exclusive-OR gate 86 connected to LDO to reflect the state of its other input, LDS, which will be discussed momentarily.

When SFS is not high, during normal read or write verify operations, SFS causes both flip flops 80 and 82 outputs to be low. When both these outputs are low, the LDS output of exclusive-OR gate 84, to which they are connected, is also low. When LDS is low, the output LDOS of the exclusive-OR gate 86 connected to it and to LDO reflects the state of LDO.

Flip flops 80 and 82 and exclusive-OR gate 84 serve the same function as registers 74 and 76 and exclusive-OR gate 78, i.e., they detect a transition in the output of comparator 62, to which flip flop 71 is connected, and signal that transition by issuing a 90 nanosecond pulse. However, as the Q NOT output of register 80 is provided as an input to flip flop 82 and flip flop 82's Q output is compared in the exclusive-OR gate 84 to the Q output of the flip flop 80, the logical level of LDS is inverted from the logical level of LDO. LDS and LDOS are normally high when no transition occurs and go low when a transition is detected. See FIG. 6f.

Flip flop 82 is clocked by REM out of register 52. REM goes high when S1 or S3 go high. Ninety nanoseconds later, REM goes low. When REM goes low, it immediately terminates SAR NOT from NAND gate 51. SAR NOT, which was low, then goes high. When SAR NOT goes high, it clocks flip flop 80 to copy the new state of comparator 62. The previous state is currently in flip flop 82. Thus the current state and the previous state are compared in the exclusive-OR gate 84 until the next REM, which occurs at the next rise of SCK ninety nanoseconds later.

The Q output of flip flop 80, which directly reflects the state of comparator 62, is provided as an input 81 to Timing Chip 44 which determines from the state of the input what sample and hold cell has the highest-valued signal and which to trigger next, just as in the read mode.

In the search for sync mode, Timing Chip 44 triggers the S1 sample and hold at each count of 1 of dHCK and dCK NOT. This is the last position of a section. It triggers the S3 sample and hold cell at each count of 0 of dHCK and dCK NOT. The state of the signal values in the two sample and holds are compared by comparator 62 and the results of the comparison are communicated to Timing Chip 44 at the next occurrence of the rising edge of SAR NOT, which occurs just after the falling edge of S3 because the falling edge of SAR NOT resets register 52 and thereby S3, one of its Q outputs, and the fall of S3 (and REM) terminates SAR NOT, which was low, causing it to rise and trigger flip flop 80. Thus the new state of the comparator is made available immediately to Timing Chip 44. This factor is important because Timing Chip 44 has less that one half period of SCK to determine which of the two sample and hold cells has the highest signal value and which of the two to trigger at the the next section position.

At the next section position, number 3, the Timing Chip retains the higher valued of the two sample and hold cells and triggers the other. This is shown by the first set of dotted lines in FIGS. 6d and 6e. And depending on the results of this comparison, the Timing Chip 44 triggers the sample and hold having the lesser valued signal at the next section, number 2. This is shown by the second set of dotted lines in FIGS. 6d and 6e. This is the fourth sampling in series and the next position number is number 1. At position number 1 the sequence of triggering just described repeats itself, and so on for every position number one until the SFS mode is ended, which occurs when a sector mark has been decoded.

Every time a new higher-valued signal in a section is recognized, exclusive-OR gate 86 issues a negative going LDOS pulse, which lasts for a period of approximately ninety nanoseconds until the next occurrence of REM, which corresponds to the next S1 or S3 signals. The rising edge of the LDOS pulse clocks address register 90 which records the state of dCK NOT and dHCK. The then current state of dCK NOT and dHCK is the mod 4 address of the position in which the occurred, plus 1. (Plus 1 because the rising edge of LDOS occurs one full cycle of SCK after the rise of either the S1 or S3 signals which caused the issuance of the LDOS pulse. See FIG. 6f.) If no new higher-valued signal is ever recognized, S1, which was triggered at position number 1, contains the highest value. The address +1 of this position is 0, and 0 is the state of the address register outputs because RER NOT resets the register at position zero of each section. The location of the sampling of the highest-valued signal corresponds to the location of the mark in the section. Only one mark occurs in a section because the marks are separated by four positions and a section is four positions long.

Figure 6:
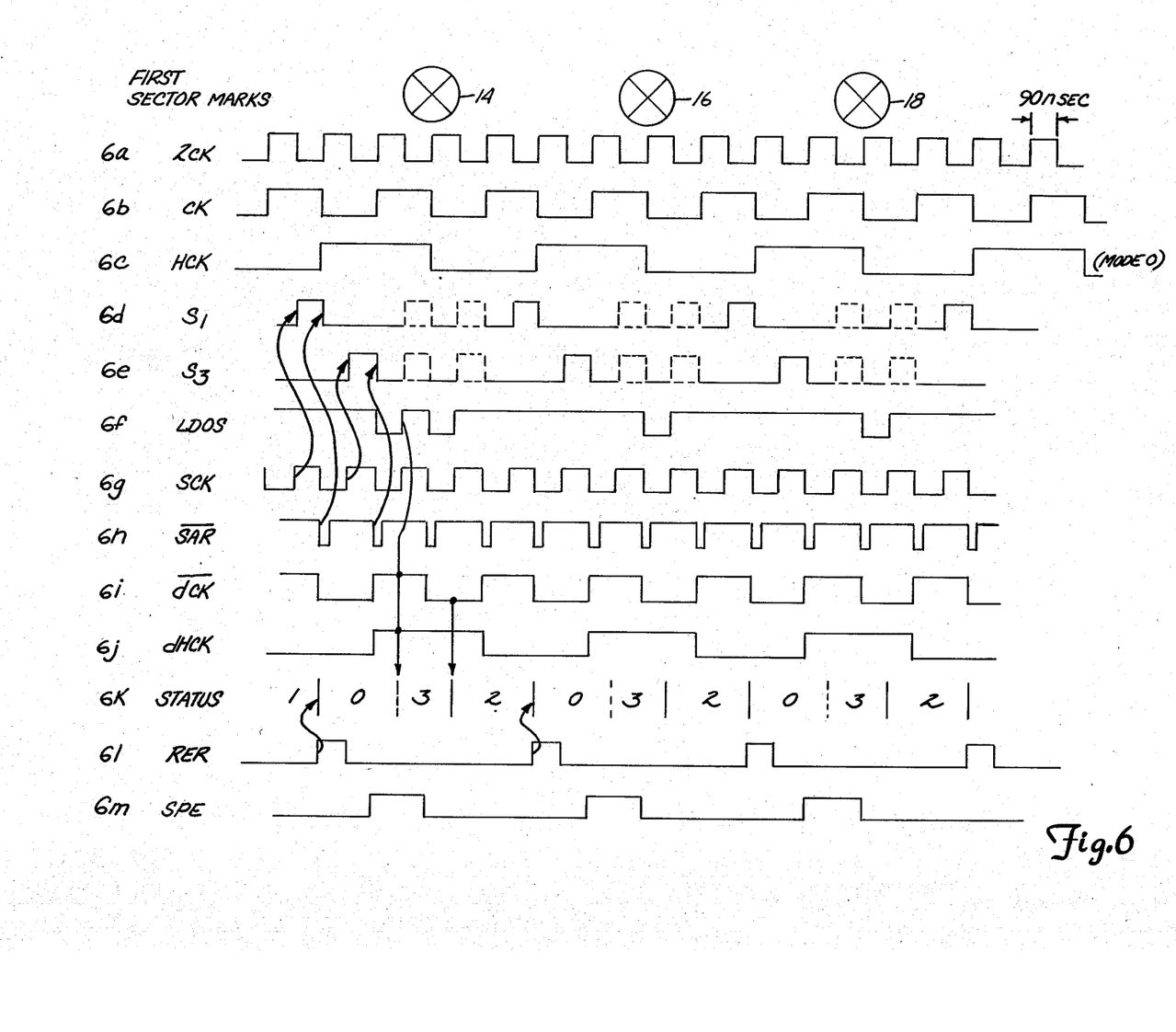
FIG. 6 consisting of 6a–6g, is a timing diagram of various signals generated by the read channel and the sector mark decoder of the present invention.

Referring to the example shown in FIG. 6, the first mark of the sector field is shown at field position number four and section position number 3, i.e., both dHCK and dCK NOT are high. The sampling at this position generates a change in the comparator 62 and causes an LDOS pulse to be issued at the rising edge of SAR NOT, when flip flop 80 is clocked. LDOS falls. Just prior to SAR NOT, 2CK clocks register 88 causing dCK NOT to fall. The state of dHCK and dCK NOT is now 10, or 2 mod 4. When LDOS rises because REM has clocked register 82, the state of dCK and dHCK remains the same because the rising edge of 2CK is about 40–50 nanoseconds away. Thus register 90 is clocked and records the address 2.

Because no new higher-valued signal is found in this section, the location of the highest valued-signal just found is the location of the mark. No more LDOS pulses are generated. The RER NOT pulse is issued at position 0 of the next section. The number 2, currently the contents of address register 90, is clocked into register 122, a sync register clocked by RER NOT. RER NOT resets register 90 to a contents of zero to prepare it to record the address of the LDOS pulse, if any, of the current section.

The above sequence is repeated every section while in SFS mode. The mod 4 field position address +1 of the mark or hole is recorded in sync register 122 at the beginning of the section when Timing Chip 44 issues the RER pulse (later inverted by inverter 50.)

At the rise of dHCK, which is fed back to Timing Chip 44, the Timing Chip issues an SPE pulse to clock Sector Mark Decoder 126. SPE occurs shortly after RER NOT in each section. See FIGS. 6m and 6l. This causes the Decoder 126 to load the outputs of sync register 122, which comprise the address bits, SB0 and SB1 from address register 90, four count bits on inputs A1 through A4, and a mode bit on A5.

The Sector Mark Decoder compares the address bits with one of a plurality of addresses as indexed by the count and mode inputs. If a match is found, the count is increment and placed on the 01 through 04 outputs. If a match is not found, the count outputs are initialized to zero. After all addresses in the sequence indexed by the count and mode have been compared, the decoder 126 issues a sync pulse not signal which will be discussed shortly.

Figure 3:
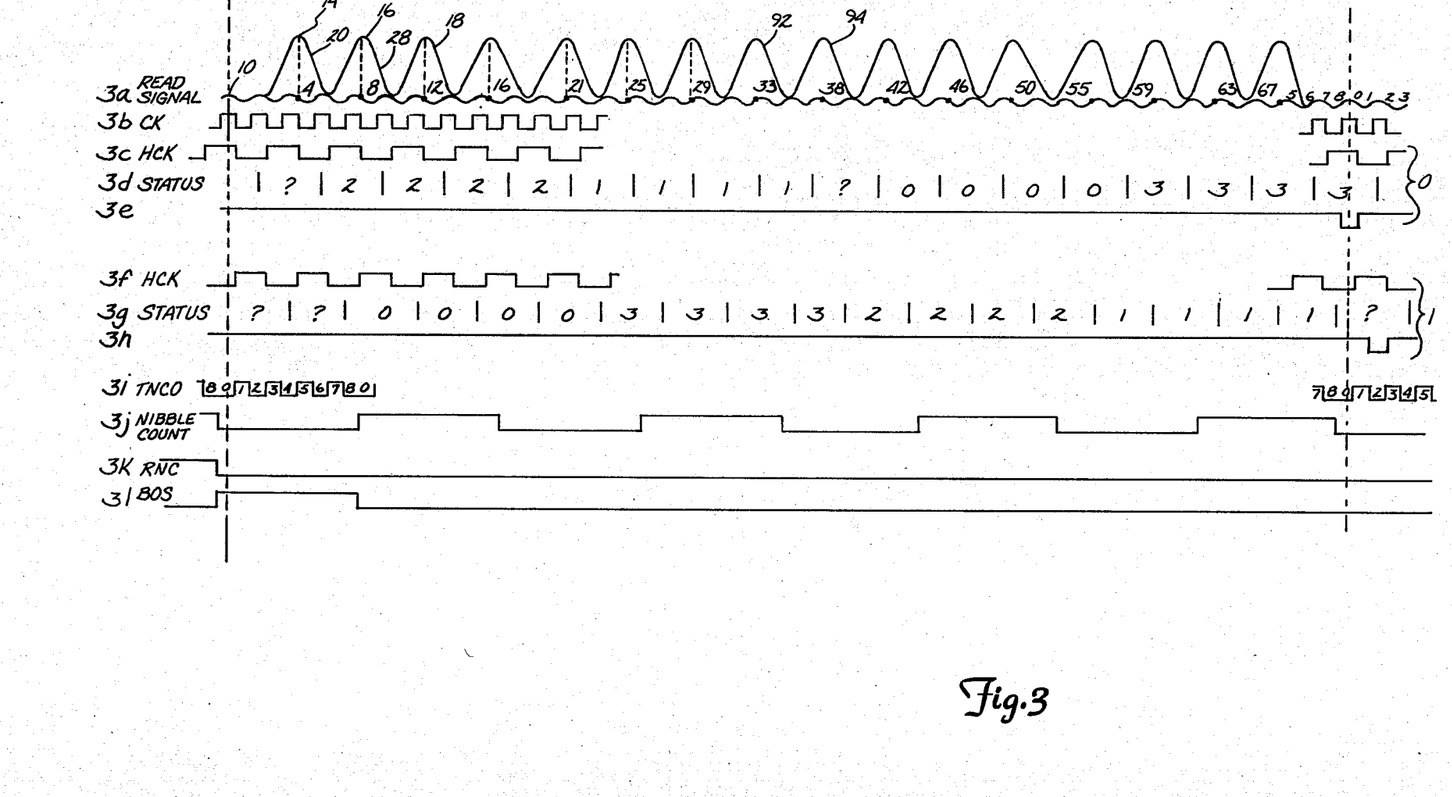
FIG. 3 consisting of 3a–3l is a timing diagram of various signals generated by the read channel and the sector mark decoder of the present invention.

As previously mentioned, the initial state of HCK relative to CK is indeterminate, and yet its state is highly determinate of the addresses of the marks as recorded by the preceding apparatus. The addresses of the 16 marks are comprised of two sets depending on the initial state of HCK. The sequence compensates for this fact by looking for both sets of addresses. If the address of the initial mark is 2, the top sequence in FIG. 3, FIG. 3d, the Decoder 126 sets its 05 output to zero indicative of zero mode. Thereafter only those addresses in the mode zero sequence are inspected as the count increments. If the initial address is 0, the decoder 126 sets the 05 output to one indicative of mode one. Thereafter, only those address in the mode one sequence, FIG. 3g, are inspected as the count increases. The mode output is fed back through sync register 122 to the A5 input of the Decoder 126.

In mode 0, the Decoder looks for the following sequence: 2 2 2 2 1 1 1 1 ? 0 0 0 3 3 3 3. The question mark is present because the space between marks 92 and 94 is five positions (33 and 38) and the triggering of the sample and holds between the marks occurs at positions 34, 35, 36 and 37 (less one), i.e., the mark 92 at position 33 has the address 1, which is the last address of a section. The next four positions, 34, 35, 36, and 37 comprise the next section, but the next mark appears at position 38. Thus, in the section comprised of positions 34 to 37 there is no mark and the results of the comparison of hole related power is indeterminate. Thus the question mark. The decoder is adapted to accept any result and increment the counter during this indeterminate section.

After the Sector mark decoder has recognized an entire sequence of sector marks, it issues a sync pulse not signal. This signal is provided to nibble counter 124 to reset it, to mode control 130 (FIG. 1) to reset SFS mode, to NAND gate 96 to temporarily disable it, and to the load 46. The count loaded is either a one or a 2 depending upon the state of the mode bit output from Decoder 126. The count 1 input is latched high, the count 4 and the count 8 inputs are latched low, while the count 2 input is latched to the 05 mode output of Decoder 126. The reason that the count 2 input of the TOON counter 46 copies the state of the mode bit from Decoder 126 is that the sync pulse NOT is issued at the first SPE pulse after the decoding sequence has been completed. SPE is issued at the rise of dHCK, which can have two states. Thus the time within the first symbol after the sector mark field that the sync pulse NOT signal is issued is determined by HCK. From inspection of FIGS. 3c, 3e, and 3f, 3h and 3i, it can be seen that in mode zero, the sync pulse is issued at symbol position number zero. At the next 2CK rising edge, which clocks TOON counter 46 to load the count on its count inputs, the count should be 1. The count 1 input to the counter is latched high and the state of the mode bit is zero. Thus the counter 46 correctly loads a count of 1. In mode one, the sync pulse is issued at symbol position number two. At the next 2CK rising edge, which clocks TOON counter 46 to load the count on its count inputs, the count should be 3. The count 1 input to the counter is latched high and the state of the mode bit is one. Thus the counter 46 correctly loads a count of 3.

At a count of 8 from the TOON counter, TNC3, after having received the sync pulse NOT, the nibble counter 126 resets to zero, whereupon it counts up by one each symbol until reaching its next predetermined count and again causes the mode select 130 to issue the SFS signal.

The enumeration of the elements of the preferred embodiment are not to be taken as a limitation on the scope of the appended claims, in which I claim:

1. Apparatus for using differential detection in decoding of sector marks comprising a plurality of marks recorded on an optical recording apparatus, comprising
   a sector mark comprising a plurality of marks recorded on an optical recording apparatus in a sector field having a first predetermined number of positions divisible into a second predetermined number of sections, the marks being recorded in a plurality of groups, each group having the marks evenly spaced from each other, the marks of half the groups recorded on the rising edge of a prerecorded clock, the marks of the other half of the groups recorded on the falling edge of said prerecorded clock, the position number, modulus said second predetermined number, of the marks of each group being different from the others;
   a CK clock having the frequency of said prerecorded clock;
   an HCK clock having half the frequency of said prerecorded clock, wherein the initial state of said HCK clock relative to said CK clock is indeterminate;
   flip flop means responsive to said CK and said HCK clocks for generating a pair of signals indicative of the state of said clocks;
   a pair of sample and hold cells responsive to read signals from an apparatus reading data from said optical recording apparatus;
   means responsive to said pair of signals for triggering a first of said sample and hold cells at every field position having a first position number, modulus said second predetermined number;
   means responsive to said pair of signals for triggering a second of said sample and hold cells at the every field position having a first position number plus one, modulus said second predetermined number;
   comparator means for comparing the first sample and hold cell value with the second sample and hold cell value and for generating a comparator output indicative of the results of the comparison;
   means responsive to said pair of signals and to said comparator means for retaining the value in the sample and hold cell having the higher value and for triggering the other sample and hold cell at the next position number and for repeating said retention and said triggering of the other sample and hold cell at the occurrence of every position number until, but excluding, the next first position number, modulus said second predetermined number;

address register means responsive to a change in the state of said comparator output and to said flip flop means for recording said pair of signals indicative of the states of said CK and said HCK clocks; sync register means for recording the state of said address register means after every first position number, modulus said second predetermined number;

decoder means responsive to one of said pairs of signals responsive to said HCK clock and further responsive to said sync register means for comparing the state of said pair of signals indicative of the state of said CK and said HCK clocks with a set of predetermined signal states as indexed by a count and for incrementing the count if there is a match and for resetting the count if there is no match, including means for incrementing the count when the state of the pair of signals may be indeterminate;

said decoder means further including means responsive to the count for issuing a sync pulse when the count reaches a predetermined count.

2. The decoding apparatus of claim 1 wherein said decoder means includes two sets of predetermined states and means for recognizing, when said count is the reset count, one or the other of two equivalent states of said pair of signals indicative of the state of said CK and said HCK clocks, depending on the initial state of said HCK clock, and, responsive to the recognition of one or the other of said two equivalent states, for thereafter indexing the corresponding one or the other of the two sets of predetermined states for the purposes of comparison with subsequent pairs of signal states.

3. The decoding apparatus of claim 2 further including means responsive to said sync pulse and to the recognition of said one or other of two equivalent states of said pair of signals indicative of the state of said CK and said HCK clocks, depending on the initial state of said HCK clock, for initializing a TOON counter means to the corresponding one or other of two counts, said TOON Counter means adapted to count the symbol positions of the data symbols of a fixed block code.

4. The decoding apparatus of claim 1 wherein said comparator means includes an latch for holding the state of the comparator means output and means for triggering the latch in response to a signal terminating the triggering of either of said sample and hold cells.

5. The decoding apparatus of claim 4 wherein said address register means includes retaining means for retaining the state of the output of said latch for one symbol position and means for exclusive-ORing the output of the latch with the retained latch output contained in the retaining means.

6. The decoding apparatus of claim 1 wherein each of said means responsive to said pair of signals for triggering a sample and hold cell includes timing means for triggering the sample and hold cell during the first half of a position and terminating the triggering shortly after the first half of the position.

* * * * *